US009165580B2

(12) United States Patent
Chen et al.

(10) Patent No.: US 9,165,580 B2
(45) Date of Patent: Oct. 20, 2015

(54) DISK DRIVE HEAD SUSPENSION TAIL WITH STIFFENED EDGE ALIGNMENT FEATURES (71) Applicant: Western Digital Technologies, Inc., Irvine, CA (US)

(72) Inventors: Yih-Jen D. Chen, Pleasanton, CA (US); Tzong-Shii Pan, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/209,909

(22) Filed: Mar. 13, 2014

(65) Prior Publication Data

US 2015/0162034 A1 Jun. 11, 2015

Related U.S. Application Data (60) Provisional application No. 61/914,315, filed on Dec. 10, 2013.

(51) Int. Cl.
*G11B 5/48* (2006.01)

(52) U.S. Cl.
CPC ............ *G11B 5/4853* (2013.01); *G11B 5/4846* (2013.01)

(58) Field of Classification Search
USPC ........................................... 360/244.7, 245.4
See application file for complete search history.

(56) References Cited

U.S. PATENT DOCUMENTS

| 5,235,482 | A  | 8/1993  | Schmitz          |
|-----------|----|---------|------------------|
| 5,903,056 | A  | 5/1999  | Canning et al.   |
| 6,036,813 | A  | 3/2000  | Schulz et al.    |
| 6,046,889 | A  | 4/2000  | Berding et al.   |
| 6,052,890 | A  | 4/2000  | Malagrino, Jr. et al. |
| 6,061,206 | A  | 5/2000  | Foisy et al.     |
| 6,101,876 | A  | 8/2000  | Brooks et al.    |
| 6,147,831 | A  | 11/2000 | Kennedy et al.   |
| 6,151,189 | A  | 11/2000 | Brooks           |
| 6,151,197 | A  | 11/2000 | Larson et al.    |
| 6,185,067 | B1 | 2/2001  | Chamberlain      |
| 6,185,074 | B1 | 2/2001  | Wang et al.      |
| 6,208,486 | B1 | 3/2001  | Gustafson et al. |
| 6,215,616 | B1 | 4/2001  | Phan et al.      |
| 6,272,694 | B1 | 8/2001  | Knoth            |
| 6,288,866 | B1 | 9/2001  | Butler et al.    |

(Continued)

OTHER PUBLICATIONS

Yih-Jen Dennis Chen, et al., U.S. Appl. No. 13/952,874, filed Jul. 29, 2013, 20 pages.

(Continued)

*Primary Examiner* — Wayne Young
*Assistant Examiner* — Carlos E Garcia (57) ABSTRACT

A head gimbal assembly for a disk drive includes a flexure tail terminal region having flexure bond pads in electrical communication with the head. Each of the flexure bond pads includes a widened region of a corresponding one of a plurality of electrical traces in a conductive layer, and a discontinuous bond pad backing island in a structural layer that overlaps the widened region. The flexure tail terminal region also includes a plurality of discontinuous edge stiffener islands in the structural layer that do not overlap the widened region of any flexure bond pad, and that are disposed no more than 50 microns from one of the two opposing longitudinal outer edges of the flexure tail terminal region. At least one of the plurality of discontinuous bond pad backing islands is disposed no more than 50 microns from one of the two opposing longitudinal outer edges.

15 Claims, 6 Drawing Sheets

(56) References Cited

U.S. PATENT DOCUMENTS

| | | |
|---|---|---|
| 6,292,333 B1 | 9/2001 | Blumentritt et al. |
| 6,344,950 B1 | 2/2002 | Watson et al. |
| 6,349,464 B1 | 2/2002 | Codilian et al. |
| 6,388,873 B1 | 5/2002 | Brooks et al. |
| 6,417,979 B1 | 7/2002 | Patton, III et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Hanan et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,703,566 B1 | 3/2004 | Shiraishi et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,708,389 B1 | 3/2004 | Carlson et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,099,117 B1 | 8/2006 | Subrahmanyam et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,205,484 B2 | 4/2007 | Shiraishi et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |

(56) References Cited

U.S. PATENT DOCUMENTS

| | | | |
|---|---|---|---|
| 7,215,513 | B1 | 5/2007 | Chang et al. |
| 7,215,514 | B1 | 5/2007 | Yang et al. |
| 7,224,551 | B1 | 5/2007 | Ou-Yang et al. |
| D543,981 | S | 6/2007 | Diebel |
| 7,227,725 | B1 | 6/2007 | Chang et al. |
| 7,239,475 | B1 | 7/2007 | Lin et al. |
| 7,271,978 | B1 | 9/2007 | Santini et al. |
| 7,274,534 | B1 | 9/2007 | Choy et al. |
| 7,280,311 | B1 | 10/2007 | Ou-Yang et al. |
| 7,280,317 | B1 | 10/2007 | Little et al. |
| 7,280,319 | B1 | 10/2007 | McNab |
| 7,292,406 | B1 | 11/2007 | Huang |
| 7,298,584 | B1 | 11/2007 | Yamada et al. |
| 7,327,537 | B1 | 2/2008 | Oveyssi |
| 7,339,268 | B1 | 3/2008 | Ho et al. |
| 7,342,746 | B1 | 3/2008 | Lin |
| RE40,203 | E | 4/2008 | Hatch et al. |
| 7,353,524 | B1 | 4/2008 | Lin et al. |
| 7,369,368 | B1 | 5/2008 | Mohajerani |
| 7,372,669 | B2 | 5/2008 | Deguchi et al. |
| 7,372,670 | B1 | 5/2008 | Oveyssi |
| 7,375,929 | B1 | 5/2008 | Chang et al. |
| 7,379,266 | B1 | 5/2008 | Ou-Yang et al. |
| 7,381,904 | B1 | 6/2008 | Codilian |
| 7,385,784 | B1 | 6/2008 | Berding et al. |
| 7,388,731 | B1 | 6/2008 | Little et al. |
| 7,391,594 | B2 | 6/2008 | Fu et al. |
| 7,414,814 | B1 | 8/2008 | Pan |
| 7,420,771 | B1 | 9/2008 | Hanke et al. |
| 7,434,987 | B1 | 10/2008 | Gustafson et al. |
| 7,436,625 | B1 | 10/2008 | Chiou et al. |
| 7,440,234 | B1 | 10/2008 | Cheng et al. |
| 7,450,346 | B2 | 11/2008 | Arya et al. |
| 7,477,488 | B1 | 1/2009 | Zhang et al. |
| 7,477,489 | B1 | 1/2009 | Chen et al. |
| 7,484,291 | B1 | 2/2009 | Ostrander et al. |
| 7,505,231 | B1 | 3/2009 | Golgolab et al. |
| 7,518,830 | B1 | 4/2009 | Panchal et al. |
| 7,529,064 | B1 | 5/2009 | Huang et al. |
| 7,538,981 | B1 | 5/2009 | Pan |
| 7,561,374 | B1 | 7/2009 | Codilian et al. |
| 7,567,410 | B1 | 7/2009 | Zhang et al. |
| 7,576,955 | B1 | 8/2009 | Yang et al. |
| 7,593,181 | B1 | 9/2009 | Tsay et al. |
| 7,605,999 | B1 | 10/2009 | Kung et al. |
| 7,609,486 | B1 | 10/2009 | Little |
| 7,610,672 | B1 | 11/2009 | Liebman |
| 7,633,721 | B1 | 12/2009 | Little et al. |
| 7,633,722 | B1 | 12/2009 | Larson et al. |
| 7,656,609 | B1 | 2/2010 | Berding et al. |
| 7,660,075 | B1 | 2/2010 | Lin et al. |
| 7,672,083 | B1 | 3/2010 | Yu et al. |
| 7,684,155 | B1 | 3/2010 | Huang et al. |
| 7,686,555 | B1 | 3/2010 | Larson et al. |
| 7,709,078 | B1 | 5/2010 | Sevier et al. |
| 7,715,149 | B1 | 5/2010 | Liebman et al. |
| 7,729,091 | B1 | 6/2010 | Huang et al. |
| 7,751,145 | B1 | 7/2010 | Lin et al. |
| 7,826,177 | B1 | 11/2010 | Zhang et al. |
| 7,852,601 | B1 | 12/2010 | Little |
| 7,864,488 | B1 | 1/2011 | Pan |
| 7,898,770 | B1 | 3/2011 | Zhang et al. |
| 7,903,369 | B1 | 3/2011 | Codilian et al. |
| 7,907,369 | B1 | 3/2011 | Pan |
| 7,911,742 | B1 | 3/2011 | Chang et al. |
| 7,926,167 | B1 | 4/2011 | Liebman et al. |
| 7,957,095 | B1 | 6/2011 | Tsay et al. |
| 7,957,102 | B1 | 6/2011 | Watson et al. |
| 7,961,436 | B1 | 6/2011 | Huang et al. |
| 8,004,782 | B1 | 8/2011 | Nojaba et al. |
| 8,009,384 | B1 | 8/2011 | Little |
| 8,018,687 | B1 | 9/2011 | Little et al. |
| 8,031,431 | B1 | 10/2011 | Berding et al. |
| 8,064,168 | B1 | 11/2011 | Zhang et al. |
| 8,064,170 | B1 | 11/2011 | Pan |
| 8,068,314 | B1 | 11/2011 | Pan et al. |
| 8,081,401 | B1 | 12/2011 | Huang et al. |
| 8,100,017 | B1 | 1/2012 | Blick et al. |
| 8,116,038 | B1 | 2/2012 | Zhang et al. |
| 8,125,740 | B1 | 2/2012 | Yang et al. |
| 8,142,671 | B1 | 3/2012 | Pan |
| 8,156,633 | B1 | 4/2012 | Foisy |
| 8,159,785 | B1 | 4/2012 | Lee et al. |
| 8,169,746 | B1 | 5/2012 | Rice et al. |
| 8,189,298 | B1 | 5/2012 | Lee et al. |
| 8,194,348 | B2 | 6/2012 | Jacoby et al. |
| 8,194,354 | B1 | 6/2012 | Zhang et al. |
| 8,194,355 | B1 | 6/2012 | Pan et al. |
| 8,203,806 | B2 | 6/2012 | Larson et al. |
| 8,223,453 | B1 | 7/2012 | Norton et al. |
| 8,228,631 | B1 | 7/2012 | Tsay et al. |
| 8,233,239 | B1 | 7/2012 | Teo et al. |
| 8,248,733 | B1 | 8/2012 | Radavicius et al. |
| 8,259,417 | B1 | 9/2012 | Ho et al. |
| 8,274,760 | B1 | 9/2012 | Zhang et al. |
| 8,276,256 | B1 | 10/2012 | Zhang et al. |
| 8,279,560 | B1 | 10/2012 | Pan |
| 8,284,514 | B1 | 10/2012 | Garbarino |
| 8,289,646 | B1 | 10/2012 | Heo et al. |
| 8,295,013 | B1 * | 10/2012 | Pan et al. .................... 360/245.4 |
| 8,300,352 | B1 | 10/2012 | Larson et al. |
| 8,305,708 | B2 | 11/2012 | Tacklind |
| 8,320,084 | B1 * | 11/2012 | Shum et al. ................. 360/245.9 |
| 8,320,086 | B1 | 11/2012 | Moradnouri et al. |
| 8,322,021 | B1 | 12/2012 | Berding et al. |
| 8,325,446 | B1 * | 12/2012 | Liu et al. .................... 360/245.9 |
| 8,345,387 | B1 | 1/2013 | Nguyen |
| 8,363,351 | B1 | 1/2013 | Little |
| 8,369,044 | B2 | 2/2013 | Howie et al. |
| 8,411,389 | B1 | 4/2013 | Tian et al. |
| 8,416,522 | B1 | 4/2013 | Schott et al. |
| 8,416,534 | B1 | 4/2013 | Heo et al. |
| 8,422,171 | B1 | 4/2013 | Guerini |
| 8,422,175 | B1 | 4/2013 | Oveyssi |
| 8,432,641 | B1 | 4/2013 | Nguyen |
| 8,437,101 | B1 | 5/2013 | German et al. |
| 8,438,721 | B1 | 5/2013 | Sill |
| 8,446,688 | B1 | 5/2013 | Quines et al. |
| 8,451,559 | B1 | 5/2013 | Berding et al. |
| 8,467,153 | B1 * | 6/2013 | Pan et al. .................... 360/264.2 |
| 8,472,131 | B1 | 6/2013 | Ou-Yang et al. |
| 8,477,460 | B1 | 7/2013 | Liebman |
| 8,488,270 | B2 | 7/2013 | Brause et al. |
| 8,488,280 | B1 | 7/2013 | Myers et al. |
| 8,499,652 | B1 | 8/2013 | Tran et al. |
| 8,514,514 | B1 | 8/2013 | Berding et al. |
| 8,530,032 | B1 | 9/2013 | Sevier et al. |
| 8,542,465 | B2 | 9/2013 | Liu et al. |
| 8,547,664 | B1 | 10/2013 | Foisy et al. |
| 8,553,356 | B1 | 10/2013 | Heo et al. |
| 8,553,366 | B1 | 10/2013 | Hanke |
| 8,553,367 | B1 | 10/2013 | Foisy et al. |
| 8,564,909 | B1 | 10/2013 | Dunn et al. |
| 8,616,900 | B1 | 12/2013 | Lion |
| 8,665,555 | B1 | 3/2014 | Young et al. |
| 8,665,566 | B1 * | 3/2014 | Pan et al. .................... 360/264.2 |
| 8,667,667 | B1 | 3/2014 | Nguyen et al. |
| 8,693,139 | B2 | 4/2014 | Tian et al. |
| 8,693,140 | B1 | 4/2014 | Weiher et al. |
| 8,699,179 | B1 | 4/2014 | Golgolab et al. |
| 8,702,998 | B1 * | 4/2014 | Guerini .......................... 216/13 |
| 8,705,201 | B2 | 4/2014 | Casey et al. |
| 8,705,209 | B2 | 4/2014 | Seymour et al. |
| 8,711,521 | B2 | 4/2014 | Feng et al. |
| 8,717,706 | B1 | 5/2014 | German et al. |
| 8,743,509 | B1 | 6/2014 | Heo et al. |
| 8,755,148 | B1 | 6/2014 | Howie et al. |
| 8,756,776 | B1 | 6/2014 | Chen et al. |
| 8,760,800 | B1 | 6/2014 | Brown et al. |
| 8,760,812 | B1 * | 6/2014 | Chen et al. .................. 360/244.1 |
| 8,760,814 | B1 | 6/2014 | Pan et al. |
| 8,760,816 | B1 | 6/2014 | Myers et al. |
| 8,773,812 | B1 | 7/2014 | Gustafson et al. |
| 8,780,491 | B1 | 7/2014 | Perlas et al. |

(56) References Cited

U.S. PATENT DOCUMENTS

| | | |
|---|---|---|
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 8,934,199 B1 * | 1/2015 | Pan ............ 360/245.4 |
| 8,941,952 B1 * | 1/2015 | Pan et al. ......... 360/244.1 |
| 2003/0128474 A1 | 7/2003 | Schulz et al. |
| 2010/0007993 A1 | 1/2010 | Contreras et al. |
| 2010/0046351 A1 | 2/2010 | McCaslin et al. |
| 2010/0220414 A1 | 9/2010 | Klarqvist et al. |
| 2011/0212281 A1 | 9/2011 | Jacoby et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

OTHER PUBLICATIONS

Tzong-Shii Pan, U.S. Appl. No. 14/231,032, filed Mar. 31, 2014, 24 pages.

* cited by examiner

DISK DRIVE HEAD SUSPENSION TAIL WITH STIFFENED EDGE ALIGNMENT FEATURES

CROSS-REFERENCE TO RELATED APPLICATION

This application claims priority to provisional U.S. Patent Application Ser. No. 61/914,315, entitled "DISK DRIVE HEAD SUSPENSION TAIL ALIGNMENT FEATURE," filed on Dec. 10, 2013, which is incorporated herein in its entirety.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

In a modern magnetic hard disk drive device, each head is a sub-component of a head gimbal assembly (HGA) that typically includes a suspension assembly with a laminated flexure to carry the electrical signals to and from the head. The HGA, in turn, is a sub-component of a head stack assembly (HSA) that typically includes a plurality of HGAs, an actuator, and a flexible printed circuit. The plurality of HGAs are attached to various arms of the actuator.

Modern laminated flexures typically include conductive copper traces that are isolated from a stainless steel structural layer by a polyimide dielectric layer. So that the signals from/to the head can reach the flexible printed circuit (FPC) on the actuator body, each suspension assembly includes a flexure tail that extends away from the head along a corresponding actuator arm and ultimately attaches to the FPC adjacent the actuator body. That is, the flexure includes traces that extend from adjacent the head and continue along the flexure tail to electrical connection points. The FPC includes conductive electrical terminals that correspond to the electrical connection points of the flexure tail.

To facilitate electrical connection of the conductive traces of the flexure tails to the conductive electrical terminals of the FPC during the HSA manufacturing process, the flexure tails must first be properly positioned relative to the FPC so that the conductive traces of the flexure tails are aligned with the conductive electrical terminals of the FPC. Then the flexure tails must be held or constrained against the conductive electrical terminals of the FPC while the aforementioned electrical connections are made, e.g., by ultrasonic bonding, solder jet bonding, solder bump reflow, or anisotropic conductive film (ACF) bonding.

An anisotropic conductive film is typically an adhesive doped with conductive beads or cylindrical particles of uniform or similar diameter. As the doped adhesive is compressed and cured, it is heated and squeezed between the surfaces to be bonded with sufficient uniform pressure that a single layer of the conductive beads makes contact with both surfaces to be bonded. In this way, the thickness of the adhesive layer between the bonded surfaces becomes approximately equal to the size of the conductive beads. The cured adhesive film may conduct electricity via the contacting beads in a direction normal to the bonded surfaces (though may not conduct electricity parallel to the bonded surfaces, since the beads may not touch each other laterally—though axially each bead is forced to contact both of the surfaces to be bonded—hence the term "anisotropic").

In a high-volume manufacturing environment like that necessitated by the very competitive information storage device industry, there is a practical requirement for fast, cost-effective, and robust bonding of many bond pads simultaneously. Moreover, it is desirable for the bonding process to be automated, which, to be practical in a high volume manufacturing operation, would require the automated bonding equipment to be able to quickly determine and achieve proper alignment of the electrical connection points and terminals. After alignment, sufficient uniform pressure must be maintained during adhesive curing, such that a single layer of conductive beads in an ACF makes contact with both opposing surfaces to be bonded.

Accordingly, there is a need in the art for an improved HGA design that may facilitate automated rapid and reliable alignment and electrical connection of the conductive traces of a flexure tail to the conductive electrical terminals of a FPC, in the context of high volume HSA manufacture.

DESCRIPTION OF THE PREFERRED EMBODIMENTS

Figure 1:
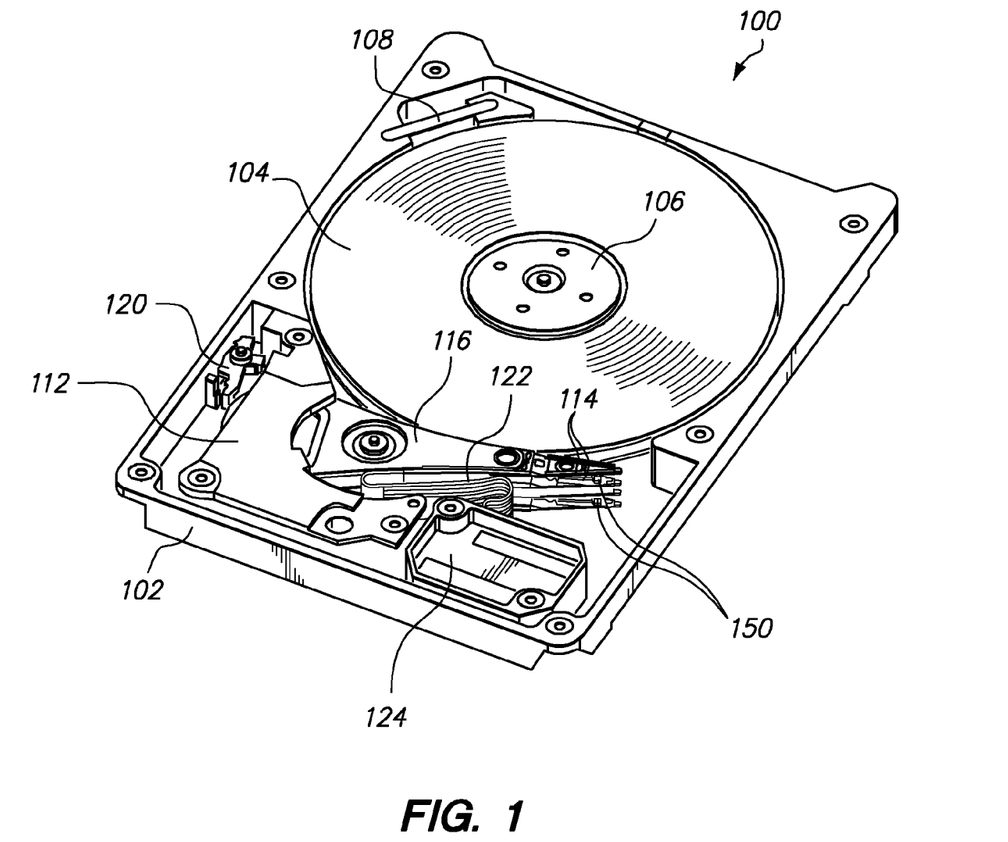
FIG. 1 is a top perspective view of a disk drive capable of including an embodiment of the present invention.

FIG. 1 is a top perspective view of a disk drive 100 capable of including an embodiment of the present invention. The disk drive 100 includes a disk drive base 102 and two annular magnetic disks 104. The disk drive 100 further includes a spindle 106, rotatably mounted on the disk drive base 102, for rotating the disks 104. The rotation of the disks 104 establishes air flow through recirculation filter 108. In other embodiments, disk drive 100 may have only a single disk, or alternatively, more than two disks.

The disk drive 100 further includes an actuator 116 that is rotatably mounted on disk drive base 102. Voice coil motor 112 rotates the actuator 116 through a limited angular range so that at least one head gimbal assembly (HGA) 114 is desirably positioned relative to one or more tracks of information on a corresponding one of the disks 104. In the embodiment of FIG. 1, the actuator 116 includes three arms upon which four HGAs 114 are attached, each corresponding to a surface of one of the two disks 104. However in other embodiments fewer or more HGAs 114 may be included depending on the number of disks 104 that are included and whether the disk drive 100 is depopulated. Each HGA 114 includes a head 150 for reading and writing data from and to one of the disks 104. The actuator 116 may occasionally be latched at an extreme angular position within the limited angular range, by latch 120. Electrical signals to/from the HGAs 114 are carried to other drive electronics via a flexible printed circuit that includes a flex cable 122 (preferably including a preamplifier circuit) and flex cable bracket 124.

Figure 2:
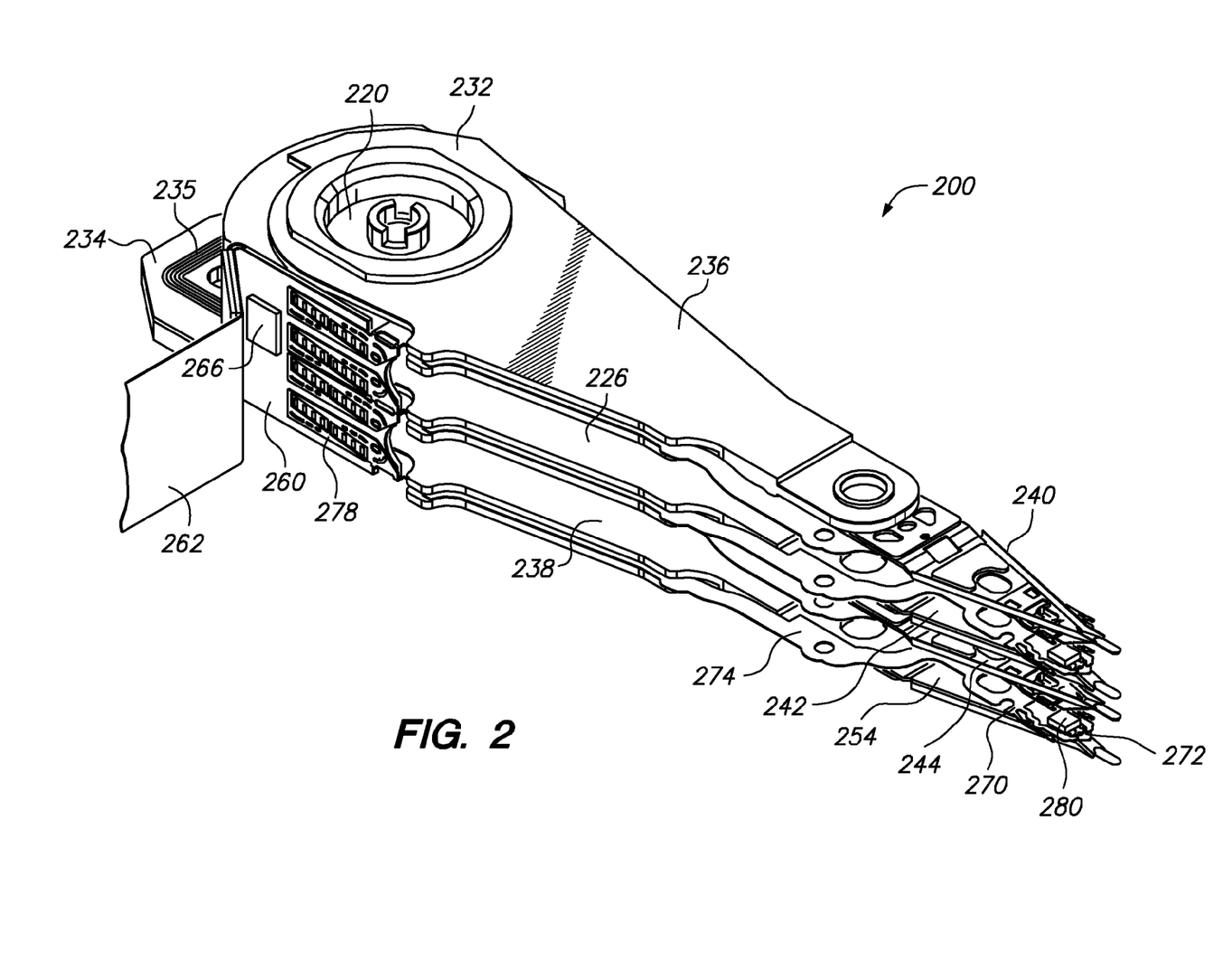
FIG. 2 is a perspective view of a head stack assembly (HSA) capable of including an embodiment of the present invention.

FIG. 2 is a perspective view of a head stack assembly (HSA) 200 capable of including an embodiment of the present invention. The HSA 200 includes an actuator body 232 and a plurality of actuator arms 226, 236, 238 extending from the actuator body 232. The actuator body 232 includes a pivot bearing cartridge 220 disposed in the actuator bore, and a coil support 234 that supports a coil 235 and extends from the actuator body 232 in a direction that is generally opposite the actuator arms 226, 236, 238. The HSA 200 also includes a plurality of head gimbal assemblies (HGA) 240, 242, 244, 254, attached to the actuator arms 226, 236, 238. For example, such attachment may be made by swaging. Note that the inner actuator arm 226 includes two HGAs, while each of the outer actuator arms 236, 238, includes only one HGA. This is because in a fully populated disk drive the inner arms are positioned between disk surfaces while the outer actuator arms are positioned over (or under) a single disk surface. In a depopulated disk drive, however, any of the actuator arms may have one or zero HGAs, possibly replaced by a dummy mass.

Each HGA includes a head for reading and/or writing to an adjacent disk surface (e.g. HGA 254 includes head 280). The head 280 is attached to a tongue portion 272 of a laminated flexure 270. The laminated flexure 270 is part of the HGA 254, and is attached to a load beam (the part of the HGA 254 to which the numerical label 254 points). The laminated flexure 270 may include a structural layer (e.g. stainless steel), a dielectric layer (e.g. polyimide), and a conductive layer into which traces are patterned (e.g. copper). The HSA 200 also includes a flexible printed circuit (FPC) 260 adjacent the actuator body 232. The FPC 260 includes a flex cable 262 and a preamplifier 266. The FPC 260 may comprise a laminate that includes two or more conventional dielectric and conductive layer materials (e.g. one or more polymeric materials, copper, etc.). The laminated flexure 270 includes a flexure tail 274 that runs along the actuator arm 238 to a terminal region 278 of the laminated flexure 270 that is electrically connected to bond pads of the FPC 260.

Methods of electrical connection of the flexure tails (e.g. flexure tail 274) to the FPC 260 include ultrasonic bonding of gold coatings thereon, solder reflow, solder ball jet (SBJ), and anisotropic conductive film (ACF) bonding, and are preferably but not necessarily automated. To electrically connect and securely attach the flexure tails to the FPC 260, the flexure tails are first aligned with the FPC 260, and then pressed against the FPC 260 (at least temporarily) while electrical connection is established and secure attachment is completed. Maintaining alignment and sufficient uniform pressure and temperature to groups of bond pads may be desirable during this process, and may be facilitated by certain inventive structural features in the terminal regions of the flexure tails.

Figure 3:
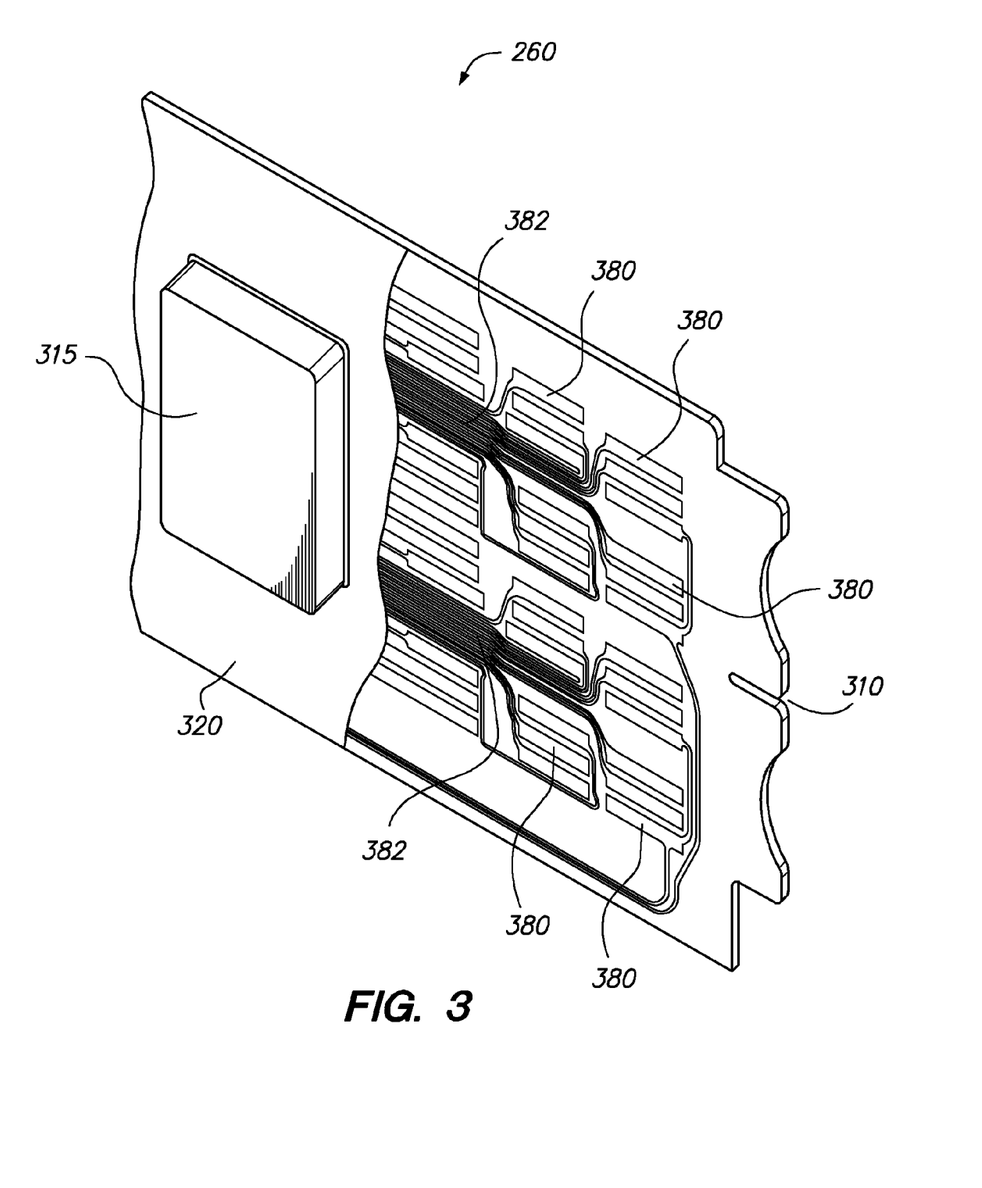
FIG. 3 is a perspective view of a portion of a flexible printed circuit (FPC) according to an embodiment of the present invention.

FIG. 3 depicts the FPC 260 before flexure tail terminal regions (i.e. the portion of each flexure tail that overlaps the FPC, for example, flexure tail terminal region 278) are bonded thereto. The FPC 260 includes electrical conduits 382 that terminate at FPC bond pads 380, which are aligned with and connected to flexure bond pads of the terminal regions (e.g. flexure tail terminal region 278) of the HGA flexure tails.

The FPC electrical conduits 382 may connect to a pre-amplifier chip 315 (shown exploded from the FPC 260 in FIG. 3). Two of the HGA flexure tails may pass through the FPC slit 310 to help facilitate their support and alignment.

The FPC 260 may include an optional insulative cover layer 320 having windows exposing the regions where the flexure tail terminal regions and the pre-amplifier chip 315 are bonded thereto. The cover layer 320 is shown cut away in the view of FIG. 3, so that the electrical conduits 382 can be better depicted.

Figures 4A, 4B:
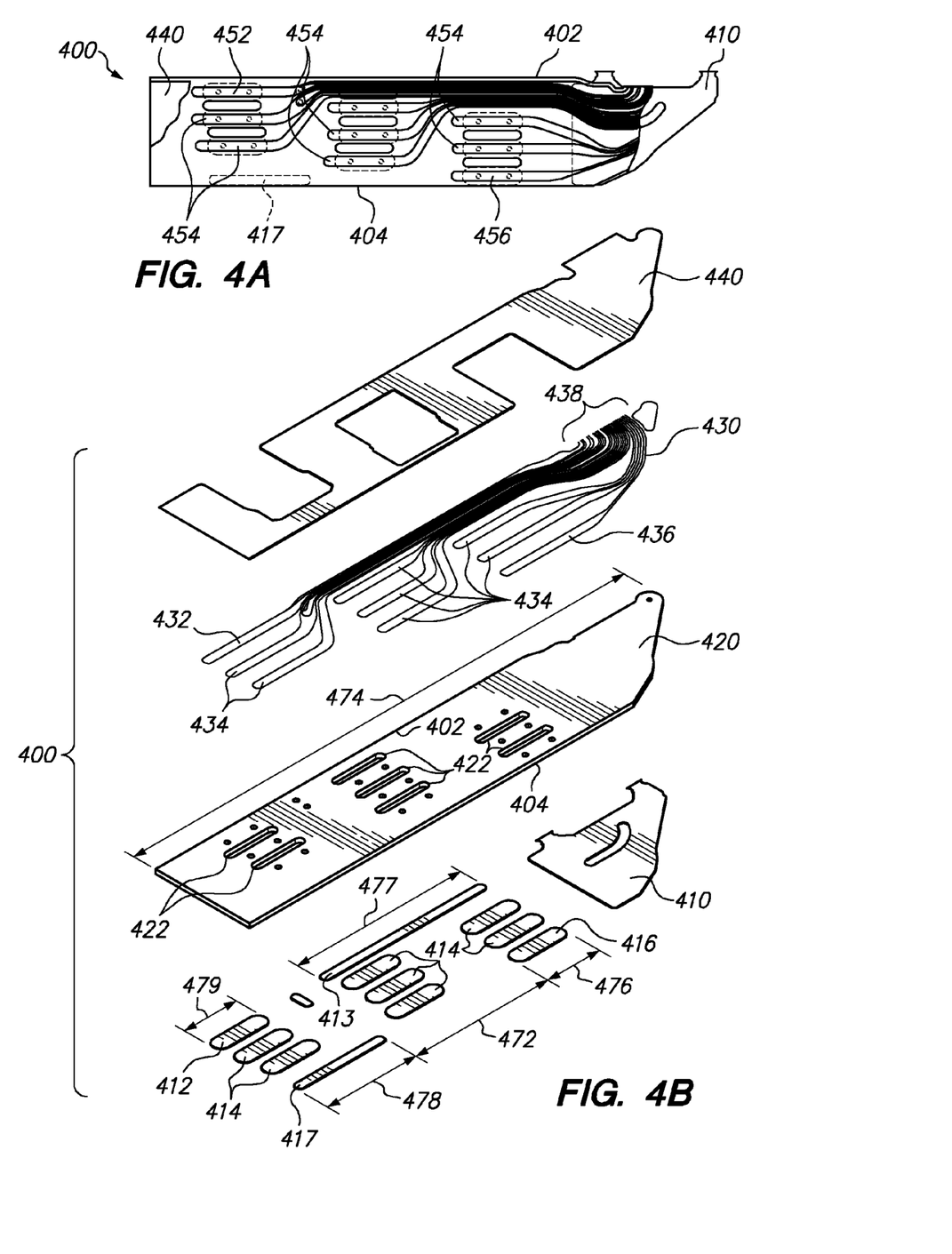
FIG. 4A is an assembled plan view of a flexure tail terminal region, according to an embodiment of the present invention.
FIG. 4B is an exploded perspective view of the flexure tail terminal region of FIG. 4A.

FIG. 4A is an assembled plan view of a flexure tail terminal region 400, according to an embodiment of the present invention. FIG. 4B is an exploded perspective view of the flexure tail terminal region 400. Now referring to FIGS. 4A and 4B, the flexure tail terminal region 400 includes a structural layer 410 (e.g. stainless steel), a conductive layer 430 (e.g. copper), and a dielectric layer 420 (e.g. polyimide) between the structural layer 410 and the conductive layer 430. The flexure tail terminal region 400 may also include an optional cover layer 440 that comprises an electrically insulative material (e.g. an insulative polymer). In certain embodiments, the thickness of the structural layer may be preferably less than 20 microns, the thickness of the dielectric layer may be preferably less than 15 microns, the thickness of the conductive layer may be preferably less than 15 microns, and a total thickness at each of the plurality of flexure bond pads may be preferably at least 25 microns.

In the embodiment of FIGS. 4A and 4B, the flexure tail terminal region 400 is bounded by two opposing longitudinal outer edges 402, 404. The flexure tail terminal region 400 includes a plurality of flexure bond pads 452, 454, 456 that are aligned with corresponding ones of a plurality of FPC bond pads (e.g. FPC bond pads 380 of FIG. 3). The dielectric layer 420 may optionally include a plurality of through openings 422, for example to control the spread of ACF material used to make electrical connections to the bond pads 452, 454, 456.

In the embodiment of FIGS. 4A and 4B, the plurality of flexure bond pads 452, 454, 456 each includes a corresponding one of a plurality of widened regions 432, 434, 436 of a plurality of electrical traces 438 in the conductive layer 430, and a corresponding one of a plurality of discontinuous bond pad backing islands 412, 414, 416 in the structural layer 410. Note that each of the discontinuous bond pad backing islands 412, 414, 416 in the structural layer 410 overlaps a corresponding one of the widened regions 432, 434, 436 of the electrical traces 438 in the conductive layer 430.

In the embodiment of FIGS. 4A and 4B, the flexure tail terminal region 400 also includes a plurality of discontinuous edge stiffener islands 413, 417 in the structural layer 410 that do not overlap any of the widened regions 432, 434, 436 of any flexure bond pad 452, 454, 456. In the embodiment of FIGS. 4A and 4B, the discontinuous edge stiffener island 413 is disposed no more than 50 microns from the longitudinal outer edge 402, and the discontinuous edge stiffener island 417 is disposed no more than 50 microns from the longitudinal outer edge 404.

In the embodiment of FIGS. 4A and 4B, the bond pad backing island 412 is also disposed no more than 50 microns from the longitudinal outer edge 402, and the bond pad backing island 416 is disposed no more than 50 microns from the longitudinal outer edge 404. The structural layer islands 412, 414, 416 that pertain to the flexure tail bond pads 452, 454, 456 may also serve to transfer heat and pressure from a flat thermode tool to the plurality of bond pads 452, 454, 456 (simultaneously), for example to facilitate ACF bonding.

In the embodiment of FIGS. 4A and 4B, preferably at least 30% of the total longitudinal extent 474 of the flexure tail terminal region 400 is longitudinally spanned by the longitudinal extent 479 of the discontinuous bond pad backing island 412 and the longitudinal extent 477 of the discontinuous edge stiffener island 413. Also, in the embodiment of FIGS. 4A and 4B, preferably at least 30% of the total longitudinal extent 474 of the flexure tail terminal region 400 is longitudinally spanned by the longitudinal extent 476 of the discontinuous bond pad backing island 416 and the longitudinal extent 478 of the discontinuous edge stiffener island 417. In this context, the total longitudinal extent 474 of the flexure tail terminal region 400 is considered to be longitudinally spanned by the longitudinal extent of any structural layer island that is disposed no more than 50 microns from either of the longitudinal outer edges 402, 404.

For example, if the total longitudinal extent 474 of the flexure tail terminal region 400 were 3.5 mm, then either of the discontinuous edge stiffener islands 413, 417, together with either of the edge-adjacent discontinuous bond pad backing islands 412, 416, may preferably cumulatively span at least 1 mm of the total longitudinal extent 474 of the flexure tail terminal region 400. For example, the structural layer islands 412, 413 that reinforce the longitudinal outer edge 402 (or the structural layer islands 416, 417 that reinforce the longitudinal outer edge 404) may preferably cumulatively span at least 1 mm of the longitudinal extent of the flexure tail terminal region 400.

Likewise, if the total longitudinal extent 474 of the flexure tail terminal region 400 were 5.5 mm, then either of the discontinuous edge stiffener islands 413, 417, together with either of the edge-adjacent discontinuous bond pad backing islands 412, 416, may preferably cumulatively span at least 1.6 mm of the longitudinal extent of the flexure tail terminal region 400. For example, the structural layer islands 412, 413 that reinforce the longitudinal outer edge 402 (or the structural layer islands 416, 417 that reinforce the longitudinal outer edge 404) may preferably cumulatively span at least 1.6 mm of the longitudinal extent of the flexure tail terminal region 400.

In certain embodiments, the maximum longitudinal spacing or gap between the structural layer islands that reinforce each of the longitudinal outer edges (e.g. the gap between structural layer islands 412 and 413, or the gap 472 between structural layer islands 416 and 417) is preferably less than 50% of the total longitudinal extent 474 of the flexure tail terminal region 400.

In certain embodiments, the dimensional limitations described in the six preceding paragraphs can strengthen or reinforce the longitudinal outer edges 402, 404, and thereby help facilitate travel of an automatic long tail (ALT) combing/alignment tool along the longitudinal outer edges 402, 404 of the flexure tail terminal region 400 to align the flexure tail terminal region 400 during the head stack assembly process. The foregoing dimensional limitations may also simplify the fixture design for a dynamic electrical testing apparatus that is used to test parts during manufacture.

Now referring to FIGS. 3, 4A and 4B, in certain embodiments the FPC 260 preferably may be designed so that the FPC conductive traces 382 are not disposed in locations that would overlap with the discontinuous edge stiffener islands 413, 417 (i.e. the islands in the structural layer 410 that reinforce the longitudinal outer edges 402, 404 of the flexure tail terminal region 400, but that are not coincident with flexure tail bond pads 452, 454, 456). Otherwise, such locations may be subject to undesirably high pressure from a thermode tool during the process of bonding the flexure tail terminal region 400 to the FPC 260, which may undesirably reduce the pressure or uniformity of pressure applied to the bond pads 452, 454, 456 by the thermode tool. Likewise, FPC conductive traces 382 are preferably not disposed in locations that would overlap with any frame or peninsula that may optionally be included in the structural layer 410 of the flexure tail terminal region 400 to increase the rigidity of the longitudinal outer edges 402, 404 (e.g. to facilitate alignment during bonding steps of the head stack assembly process).

Figure 5A:
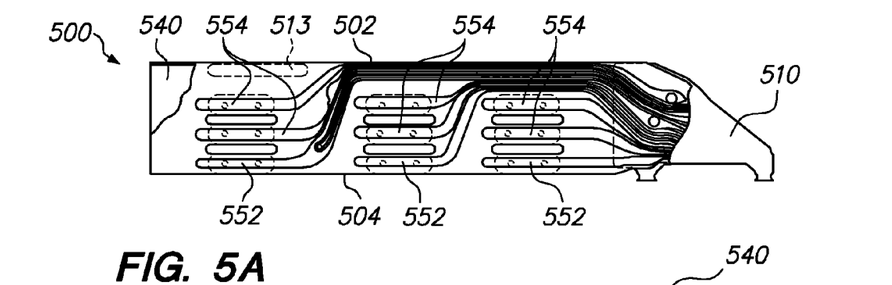
FIG. 5A is an assembled plan view of a flexure tail terminal region, according to another embodiment of the present invention.
Figure 5B:
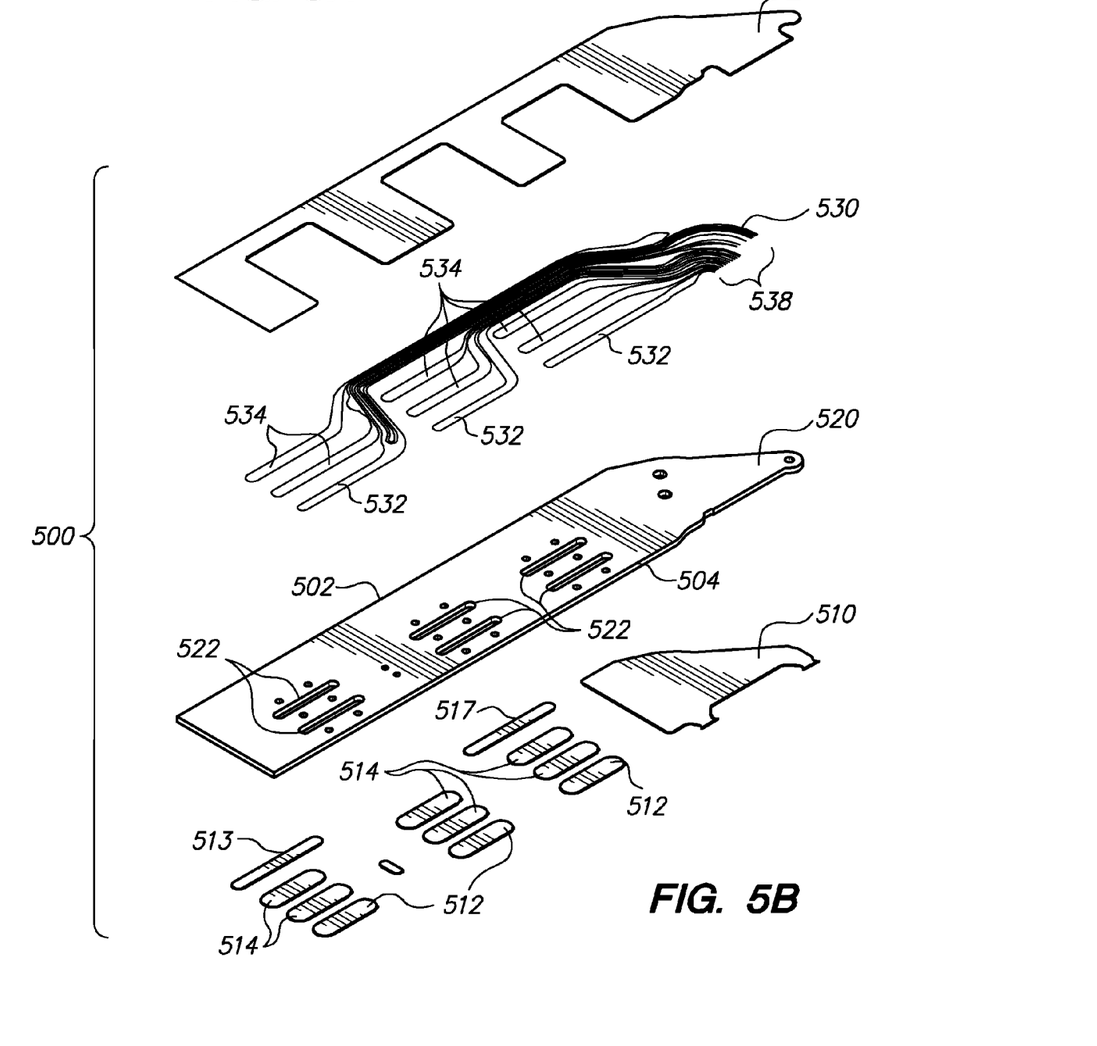
FIG. 5B is an exploded perspective view of the flexure tail terminal region of FIG. 5A.

FIG. 5A is an assembled plan view of a flexure tail terminal region 500, according to an embodiment of the present invention. FIG. 5B is an exploded perspective view of the flexure tail terminal region 500. Now referring to FIGS. 5A and 5B, the flexure tail terminal region 500 includes a structural layer 510 (e.g. stainless steel), a conductive layer 530 (e.g. copper), and a dielectric layer 520 (e.g. polyimide) between the structural layer 510 and the conductive layer 530. The flexure tail terminal region 500 may also include an optional cover layer 540 that comprises an electrically insulative material (e.g. an insulative polymer). In certain embodiments, the thickness of the structural layer may be preferably less than 20 microns, the thickness of the dielectric layer may be preferably less than 15 microns, the thickness of the conductive layer may be preferably less than 15 microns, and a total thickness at each of the plurality of flexure bond pads may be preferably at least 25 microns.

In the embodiment of FIGS. 5A and 5B, the flexure tail terminal region 500 is bounded by two opposing longitudinal outer edges 502, 504. The flexure tail terminal region 500 includes a plurality of flexure bond pads 552, 554 that are aligned with corresponding ones of a plurality of FPC bond pads (e.g. FPC bond pads 380 of FIG. 3). The dielectric layer 520 may optionally include a plurality of through openings 522, for example to control the spread of ACF material used to make electrical connections to the bond pads 552, 554.

In the embodiment of FIGS. 5A and 5B, the plurality of flexure bond pads 552, 554 each includes a corresponding one of a plurality of widened regions 532, 534 of a plurality of electrical traces 538 in the conductive layer 530, and a corresponding one of a plurality of discontinuous bond pad backing islands 512, 514 in the structural layer 510. Note that each of the discontinuous bond pad backing islands 512, 514 in the structural layer 510 overlaps a corresponding one of the widened regions 532, 534 of the electrical traces 538 in the conductive layer 530.

In the embodiment of FIGS. 5A and 5B, the flexure tail terminal region 500 also includes a plurality of discontinuous edge stiffener islands 513, 517 in the structural layer 510 that do not overlap any of the widened regions 532, 534 of any flexure bond pad 552, 554. In the embodiment of FIGS. 5A and 5B, the discontinuous edge stiffener islands 513, 517 are each disposed no more than 50 microns from the longitudinal outer edge 502.

In the embodiment of FIGS. 5A and 5B, the bond pad backing islands 512 are each disposed no more than 50 microns from the longitudinal outer edge 504. The structural layer islands 512, 514 that pertain to the flexure tail bond pads 552, 554 may also serve to transfer heat and pressure from a flat thermode tool to the plurality of bond pads 552, 554 (simultaneously), for example to facilitate ACF bonding during head stack assembly.

In the embodiment of FIGS. 5A and 5B, preferably at least 30% of a total longitudinal extent of the flexure tail terminal region 500 is longitudinally spanned by at least one of the discontinuous bond pad backing islands 512 and the discontinuous edge stiffener island 513. Also, in the embodiment of FIGS. 5A and 5B, preferably at least 30% of a total longitudinal extent of the flexure tail terminal region 500 is longitudinally spanned by at least one of the discontinuous bond pad backing islands 512 and the discontinuous edge stiffener island 517. In this context, the total longitudinal extent of the flexure tail terminal region 500 is considered to be longitudinally spanned by the longitudinal extent of any structural layer island that is disposed no more than 50 microns from either of the two longitudinal outer edges 502, 504.

For example, if the total longitudinal extent of the flexure tail terminal region 500 were 3.5 mm, then either of the discontinuous edge stiffener islands 513, 517, together with at least one of the edge-adjacent discontinuous bond pad backing islands 512 may preferably cumulatively span at least 1 mm of the total longitudinal extent of the flexure tail terminal region 500. Likewise, if the total longitudinal extent of the flexure tail terminal region 500 were 5.5 mm, then either of the discontinuous edge stiffener islands 513, 517, together with at least one of the edge-adjacent discontinuous bond pad backing islands 512 may preferably cumulatively span at least 1.6 mm of the total longitudinal extent of the flexure tail terminal region 500.

In certain embodiments, the maximum longitudinal spacing or gap between the structural layer islands that reinforce each of the longitudinal outer edges (e.g. between any adjacent two of the structural layer islands 512, or between the structural layer islands 513 and 517) is preferably less than 50% of the total longitudinal extent of the flexure tail terminal region 500.

In certain embodiments, the dimensional limitations described in the five preceding paragraphs can strengthen or reinforce the longitudinal outer edges 502, 504, and thereby help facilitate travel of an automatic long tail (ALT) combing/alignment tool along the longitudinal outer edges 502, 504 of the flexure tail terminal region 500 to align the flexure tail terminal region 500 during the head stack assembly process. The foregoing dimensional limitations may also simplify the fixture design for a dynamic electrical testing apparatus that is used to test parts during manufacture.

Now referring to FIGS. 3, 5A and 5B, in certain embodiments the FPC 260 preferably may be designed so that the FPC conductive traces 382 are not disposed in locations that would overlap with the discontinuous edge stiffener islands 513, 517 (i.e. the islands in the structural layer 510 that reinforce the longitudinal outer edge 502 of the flexure tail terminal region 500, but that are not coincident with flexure tail bond pads 552, 554). Otherwise, such locations may be subject to undesirably high pressure from a thermode tool during the process of bonding the flexure tail terminal region 500 to the FPC 260, which may undesirably reduce the pressure or uniformity of pressure applied to the bond pads 552, 554 by the thermode tool during the head stack assembly process.

Figure 6A:
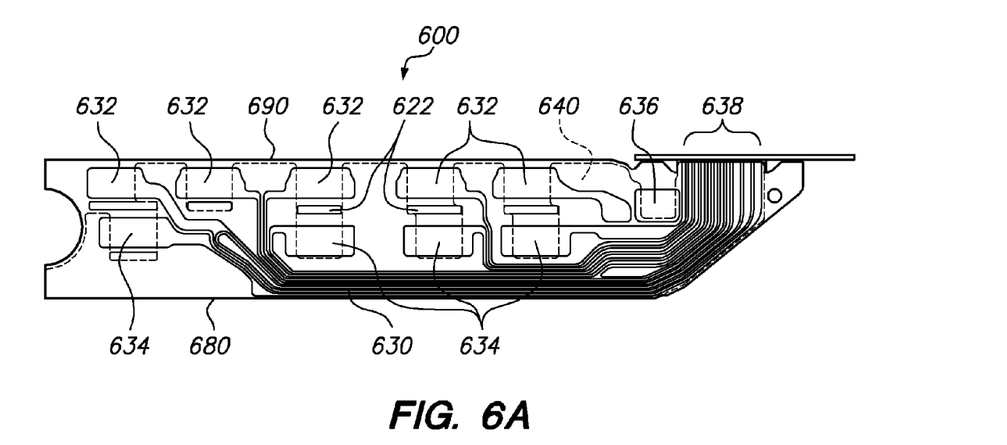
FIG. 6A depicts a plan view of a flexure tail terminal region according to another embodiment of the present invention, facing the conductive layer side.
Figure 6B:
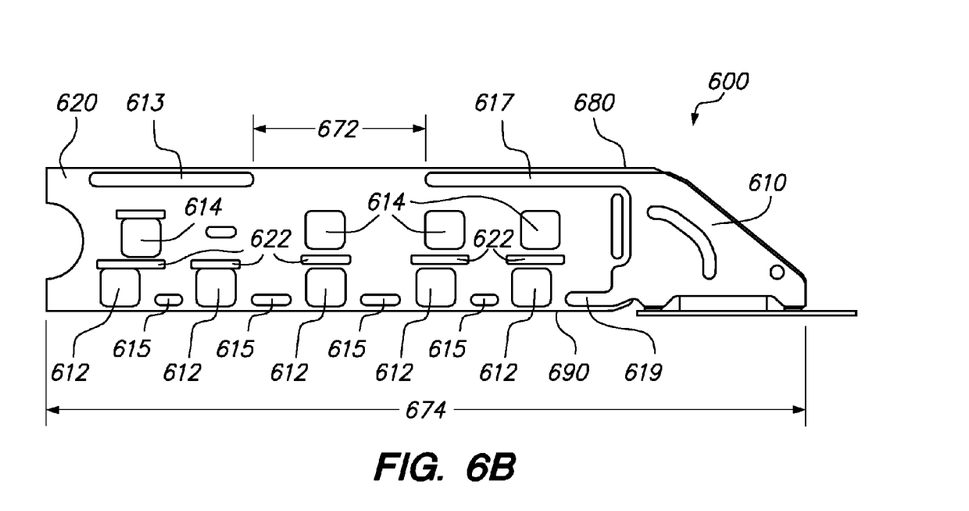
FIG. 6B depicts a plan view of the flexure tail terminal region of FIG. 6A, facing the structural layer side.

FIG. 6A depicts a plan view of a flexure tail terminal region 600 according to another embodiment of the present invention, facing the side that includes its conductive layer 630. FIG. 6B depicts a plan view of the flexure tail terminal region 600, facing the side that includes its structural layer 610. Now referring to FIGS. 6A and 6B, the flexure tail terminal region 600 includes a structural layer 610 (e.g. stainless steel), a conductive layer 630 (e.g. copper), and a dielectric layer 620 (e.g. polyimide) between the structural layer 610 and the conductive layer 630. The flexure tail terminal region 600 may also include an optional cover layer 640 that comprises an electrically insulative material (e.g. an insulative polymer).

In the embodiment of FIGS. 6A and 6B, the flexure tail terminal region 600 is bounded by two opposing longitudinal outer edges 680, 690. The flexure tail terminal region 600 includes a plurality of flexure bond pads that are aligned with corresponding ones of a plurality of FPC bond pads (e.g. FPC bond pads 380 of FIG. 3). The dielectric layer 620 may optionally include a plurality of through openings 622, for example to control the spread of ACF material used to make electrical connections to the bond pads. In the embodiment of FIGS. 6A and 6B, a ground pad 636 of the conductive layer 630 may be electrically connected to the structural layer 610 of the flexure thru a conventional via in the dielectric layer 620 (e.g. polyimide layer) that is disposed between the conductive layer 630 and the structural layer 610.

In the embodiment of FIGS. 6A and 6B, the plurality of flexure bond pads each includes a corresponding one of a plurality of widened regions 632, 634 of a plurality of electrical traces 638 in the conductive layer 630, and a corresponding one of a plurality of discontinuous bond pad backing islands 612, 614 in the structural layer 610. Note that each of the discontinuous bond pad backing islands 612, 614 in the structural layer 610 overlaps a corresponding one of the widened regions 632, 634 of the electrical traces 638 in the conductive layer 630. In the embodiment of FIGS. 6A and 6B, each of the bond pad backing islands 612 is disposed no more than 50 microns from the longitudinal outer edge 690, although that is not true for the bond pad backing islands 614. The structural layer islands 612, 614 that pertain to the flexure tail bond pads may also serve to transfer heat and pressure from a flat thermode tool to the plurality of bond pads (simultaneously), for example to facilitate ACF bonding.

In the embodiment of FIGS. 6A and 6B, the flexure tail terminal region 600 also includes a plurality of discontinuous edge stiffener islands 613, 615 in the structural layer 610 that do not overlap any of the widened regions 632, 634 of any flexure bond pad. In the embodiment of FIGS. 6A and 6B, the discontinuous edge stiffener island 613 is disposed no more than 50 microns from the longitudinal outer edge 680, and the discontinuous edge stiffener islands 615 are each disposed no more than 50 microns from the longitudinal outer edge 690.

In the embodiment of FIGS. 6A and 6B, the flexure tail terminal region 600 further comprises narrow peninsulas 617, 619 in the structural layer 610 that are contiguous with the structural layer 610 in the flexure tail as it runs outside of the flexure tail terminal region (e.g. contiguous with the structural layer that runs along the actuator arm in 238 in flexure tail 274 of FIG. 2). In the embodiment of FIG. 6B, the narrow peninsula 617 is disposed no more than 50 microns from the longitudinal outer edge 680, and the narrow peninsula 619 is disposed no more than 50 microns from the longitudinal outer edge 690. In this context, a peninsula is narrow if it is more than three times longer than it is wide in the plan view of FIG. 6B.

In the embodiment of FIGS. 6A and 6B, preferably at least 30% of the total longitudinal extent 674 of the flexure tail terminal region 600 is longitudinally spanned by the discontinuous bond pad backing islands 612 and the discontinuous edge stiffener islands 615. Also, in the embodiment of FIGS. 6A and 6B, preferably at least 30% of the total longitudinal extent 674 of the flexure tail terminal region 600 is longitudinally spanned by at least one of the discontinuous bond pad backing islands 612 and the discontinuous edge stiffener island 613. In this context, the total longitudinal extent 674 of the flexure tail terminal region 600 is considered to be longitudinally spanned by the longitudinal extent of any structural layer island that is disposed no more than 50 microns from either of the longitudinal outer edges 680, 690.

In certain embodiments, the maximum longitudinal spacing or gap between the structural layer reinforcements of each of the longitudinal outer edges (e.g. any gap between adjacent structural layer islands 612 and 615, or the gap 672 between structural layer island 613 and narrow peninsula 617) is preferably less than 50% of the total longitudinal extent 674 of the flexure tail terminal region 600.

In certain embodiments, the dimensional limitations described in the five preceding paragraphs can strengthen or reinforce the longitudinal outer edges 680, 690, and thereby help facilitate travel of an automatic long tail (ALT) combing/alignment tool along the longitudinal outer edges 680, 690 of the flexure tail terminal region 600, to align the flexure bond pads with corresponding ones of the FPC bond pads. The alignment may be accomplished by contact (along a longitudinal contact span) between the alignment tool and at least one of the longitudinal outer edges 680, 690. In the embodiment of FIG. 6B, the longitudinal spacing 672, or the maximum longitudinal spacing between any adjacent edge-reinforcing structural layer islands 612, 615, may be preferably no greater than 50% of the longitudinal contact span. In certain embodiments, such dimensional inequality may help facilitate more reliable alignment of the flexure tail and the FPC during the head stack assembly process.

Now referring to FIGS. 3, 6A and 6B, in certain embodiments the FPC 260 preferably may be designed so that the FPC conductive traces 382 are not disposed in locations that would overlap with the discontinuous edge stiffener island 613 or the narrow peninsulas 617, 619. Otherwise, such locations may be subject to undesirably high pressure from a thermode tool during the process of bonding the flexure tail terminal region 600 to the FPC 260, which may undesirably reduce the pressure or uniformity of pressure applied to the flexure bond pads by the thermode tool during head stack assembly.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
   a disk drive base;
   a disk rotatably mounted to the disk drive base;
   an actuator rotatably mounted to the disk drive base, the actuator including at least one actuator arm and a flexible printed circuit (FPC) that includes a plurality of electrically conductive FPC bond pads; and
   at least one head gimbal assembly attached to the at least one actuator arm, the at least one head gimbal assembly comprising
      a head for reading and writing data on the disk; and
      a suspension assembly that comprises
         a load beam, and
         a laminated flexure that comprises a structural layer, a conductive layer, and a dielectric layer between the structural layer and the conductive layer, the laminated flexure including a tongue portion that connects to the head and a flexure tail that extends to the plurality of FPC bond pads;
   wherein the flexure tail includes a flexure tail terminal region that overlaps the FPC, the flexure tail terminal region being bounded by first and second longitudinal outer edges, the flexure tail terminal region including a plurality of flexure bond pads in electrical communication with the head, each of the plurality of flexure bond pads being aligned with a corresponding one of the plurality of FPC bond pads, each of the plurality of flexure bond pads including
      a widened region of a corresponding one of a plurality of electrical traces in the conductive layer; and
      one of a plurality of discontinuous bond pad backing islands in the structural layer that overlaps the widened region;
   wherein the flexure tail terminal region also includes a plurality of discontinuous edge stiffener islands in the structural layer that do not overlap the widened region of any flexure bond pad; and
   wherein each of the plurality of discontinuous edge stiffener islands is disposed no more than 50 microns from the first longitudinal outer edge or the second longitudinal outer edge, and at least one of the plurality of discontinuous bond pad backing islands is disposed no more than 50 microns from the first longitudinal outer edge or the second longitudinal outer edge.

2. The disk drive of claim 1 wherein at least 30% of a total longitudinal span of the flexure tail terminal region that overlaps the FPC is longitudinally spanned by the at least one of the plurality of discontinuous bond pad backing islands and at least one of the plurality of discontinuous edge stiffener islands.

3. The disk drive of claim 2 wherein the total longitudinal span of the flexure tail terminal region that overlaps the FPC is in the range of 3.5 mm to 5.5 mm.

4. The disk drive of claim 1 wherein the structural layer comprises stainless steel, the dielectric layer comprises polyimide, and the conductive layer comprises copper.

5. The disk drive of claim 1 wherein each of the plurality of flexure bond pads is bonded to the corresponding one of the plurality of FPC bond pads by an anisotropic conductive film.

6. The disk drive of claim 1 wherein the flexure tail terminal region further comprises at least one narrow peninsula in the structural layer that is contiguous with the structural layer in the flexure tail outside of the flexure tail terminal region, the at least one narrow peninsula being disposed no more than 50 microns from the first longitudinal outer edge or the second longitudinal outer edge.

7. A head gimbal assembly (HGA) for a disk drive, the HGA comprising:
   a head for reading and writing data; and
   a suspension assembly that comprises
      a load beam, and
      a laminated flexure that comprises a structural layer, a conductive layer, and a dielectric layer between the structural layer and the conductive layer, the laminated flexure including
         a proximal tongue portion that connects to the head and
         a flexure tail that extends away from the proximal tongue portion to a distal flexure tail terminal region;
   wherein the distal flexure tail terminal region includes a plurality of flexure bond pads in electrical communication with the head, the distal flexure tail terminal region being bounded by first and second longitudinal outer edges, each of the plurality of flexure bond pads including
      a widened region of a corresponding one of a plurality of electrical traces in the conductive layer; and one of a plurality of discontinuous bond pad backing islands in the structural layer that overlaps the widened region;

wherein the distal flexure tail terminal region also includes a plurality of discontinuous edge stiffener islands in the structural layer that do not overlap the widened region of any flexure bond pad; and wherein each of the plurality of discontinuous edge stiffener islands is disposed no more than 50 microns from the first longitudinal outer edge or the second longitudinal outer edge, and at least one of the plurality of discontinuous bond pad backing islands is disposed no more than 50 microns from the first longitudinal outer edge or the second longitudinal outer edge.

8. The HGA of claim 7 wherein at least 30% of a total longitudinal span of the distal flexure tail terminal region is longitudinally spanned by the at least one of the plurality of discontinuous bond pad backing islands and at least one of the plurality of discontinuous edge stiffener islands.

9. The HGA of claim 8 wherein the total longitudinal span of the distal flexure tail terminal region is in the range of 3.5 mm to 5.5 mm.

10. The HGA of claim 7 wherein the structural layer comprises stainless steel, the dielectric layer comprises polyimide, and the conductive layer comprises copper.

11. The HGA of claim 7 wherein each of the plurality of flexure bond pads is coated by an anisotropic conductive film material.

12. The HGA of claim 7 wherein the flexure tail terminal region further comprises at least one narrow peninsula in the structural layer that is contiguous with the structural layer in the flexure tail outside of the distal flexure tail terminal region, the at least one narrow peninsula being disposed no more than 50 microns from the first longitudinal outer edge or the second longitudinal outer edge.

13. A disk drive comprising:
a disk drive base;
a disk rotatably mounted to the disk drive base;
an actuator rotatably mounted to the disk drive base, the actuator including at least one actuator arm and a flexible printed circuit (FPC) that includes a plurality of electrically conductive FPC bond pads; and
at least one head gimbal assembly attached to the at least one actuator arm, the at least one head gimbal assembly comprising
a head for reading and writing data on the disk; and
a suspension assembly that comprises
a load beam, and
a laminated flexure that comprises a structural layer, a conductive layer, and a dielectric layer between the structural layer and the conductive layer, the laminated flexure including a tongue portion that connects to the head and a flexure tail that extends to the plurality of FPC bond pads;
wherein the flexure tail includes a flexure tail terminal region that overlaps the FPC, the flexure tail terminal region being bounded by first and second longitudinal outer edges, the flexure tail terminal region including a plurality of flexure bond pads in electrical communication with the head, each of the plurality of flexure bond pads being aligned with a corresponding one of the plurality of FPC bond pads, each of the plurality of flexure bond pads including
a widened region of a corresponding one of a plurality of electrical traces in the conductive layer; and
one of a plurality of discontinuous bond pad backing islands in the structural layer that overlaps the widened region;
wherein the flexure tail terminal region also includes a plurality of discontinuous edge stiffener islands in the structural layer that do not overlap the widened region of any flexure bond pad;
wherein each of the plurality of discontinuous edge stiffener islands is disposed no more than 50 microns from the first longitudinal outer edge or the second longitudinal outer edge, and at least one of the plurality of discontinuous bond pad backing islands is disposed no more than 50 microns from the first longitudinal outer edge or the second longitudinal outer edge; and
wherein the FPC includes a FPC patterned conductive layer that includes the electrically conductive FPC bond pads, and wherein the FPC patterned conductive layer does not overlap any of the plurality of discontinuous edge stiffener islands of the flexure tail terminal region.

14. A disk drive comprising:
a disk drive base;
a disk rotatably mounted to the disk drive base;
an actuator rotatably mounted to the disk drive base, the actuator including at least one actuator arm and a flexible printed circuit (FPC) that includes a plurality of electrically conductive FPC bond pads; and
at least one head gimbal assembly attached to the at least one actuator arm, the at least one head gimbal assembly comprising
a head for reading and writing data on the disk; and
a suspension assembly that comprises
a load beam, and
a laminated flexure that comprises a structural layer, a conductive layer, and a dielectric layer between the structural layer and the conductive layer, the laminated flexure including a tongue portion that connects to the head and a flexure tail that extends to the plurality of FPC bond pads;
wherein the flexure tail includes a flexure tail terminal region that overlaps the FPC, the flexure tail terminal region being bounded by first and second longitudinal outer edges, the flexure tail terminal region including a plurality of flexure bond pads in electrical communication with the head, each of the plurality of flexure bond pads being aligned with a corresponding one of the plurality of FPC bond pads, each of the plurality of flexure bond pads including
a widened region of a corresponding one of a plurality of electrical traces in the conductive layer; and
one of a plurality of discontinuous bond pad backing islands in the structural layer that overlaps the widened region;
wherein the flexure tail terminal region also includes a plurality of discontinuous edge stiffener islands in the structural layer that do not overlap the widened region of any flexure bond pad;
wherein each of the plurality of discontinuous edge stiffener islands is disposed no more than 50 microns from the first longitudinal outer edge or the second longitudinal outer edge, and at least one of the plurality of discontinuous bond pad backing islands is disposed no more than 50 microns from the first longitudinal outer edge or the second longitudinal outer edge;
wherein at least 30% of a total longitudinal span of the flexure tail terminal region that overlaps the FPC is longitudinally spanned by the at least one of the plurality of discontinuous bond pad backing islands and at least one of the plurality of discontinuous edge stiffener islands;

wherein the total longitudinal span of the flexure tail terminal region that overlaps the FPC is in the range of 3.5 mm to 5.5 mm; and wherein a maximum longitudinal spacing between the at least one of the plurality of discontinuous bond pad backing islands and an adjacent one of the plurality of discontinuous edge stiffener islands is no greater than 50% of the total longitudinal span of the flexure tail terminal region that overlaps the FPC.

15. A head gimbal assembly (HGA) for a disk drive, the HGA comprising:

a head for reading and writing data; and a suspension assembly that comprises a load beam, and a laminated flexure that comprises a structural layer, a conductive layer, and a dielectric layer between the structural layer and the conductive layer, the laminated flexure including a proximal tongue portion that connects to the head and a flexure tail that extends away from the proximal tongue portion to a distal flexure tail terminal region;

wherein the distal flexure tail terminal region includes a plurality of flexure bond pads in electrical communication with the head, the distal flexure tail terminal region being bounded by first and second longitudinal outer edges, each of the plurality of flexure bond pads including a widened region of a corresponding one of a plurality of electrical traces in the conductive layer; and one of a plurality of discontinuous bond pad backing islands in the structural layer that overlaps the widened region;

wherein the distal flexure tail terminal region also includes a plurality of discontinuous edge stiffener islands in the structural layer that do not overlap the widened region of any flexure bond pad;

wherein each of the plurality of discontinuous edge stiffener islands is disposed no more than 50 microns from the first longitudinal outer edge or the second longitudinal outer edge, and at least one of the plurality of discontinuous bond pad backing islands is disposed no more than 50 microns from the first longitudinal outer edge or the second longitudinal outer edge;

wherein at least 30% of a total longitudinal span of the distal flexure tail terminal region is longitudinally spanned by the at least one of the plurality of discontinuous bond pad backing islands and at least one of the plurality of discontinuous edge stiffener islands;

wherein the total longitudinal span of the distal flexure tail terminal region is in the range of 3.5 mm to 5.5 mm; and wherein a maximum longitudinal spacing between the at least one of the plurality of discontinuous bond pad backing islands and an adjacent one of the plurality of discontinuous edge stiffener islands is no greater than 50% of the total longitudinal span of the distal flexure tail terminal region.

* * * * *